(12) United States Patent
Pano et al.

(10) Patent No.: US 10,881,054 B2
(45) Date of Patent: Jan. 5, 2021

(54) FABRICS CONTAINING A FILLER AND METHODS OF ENHANCING CROP GROWTH

(71) Applicant: AVINTIV Specialty Materials, Inc., Charlotte, NC (US)

(72) Inventors: Robert Garcia Pano, Tarragona (ES); Marie-Pierre Burckel, Ensisheim (FR)

(73) Assignee: AVINTIV Specialty Materials, Inc., Charlotte, NC (US)

( * ) Notice: Subject to any disclaimer, the term of this patent is extended or adjusted under 35 U.S.C. 154(b) by 0 days.

(21) Appl. No.: 16/807,472

(22) Filed: Mar. 3, 2020

(65) Prior Publication Data

US 2020/0196538 A1   Jun. 25, 2020

Related U.S. Application Data

(62) Division of application No. 15/015,987, filed on Feb. 4, 2016, now Pat. No. 10,617,068.

(Continued)

(51) Int. Cl.
| | |
|---|---|
| *A01G 13/02* | (2006.01) |
| *D04H 3/16* | (2006.01) |
| *B32B 5/06* | (2006.01) |
| *B32B 5/26* | (2006.01) |
| *B32B 5/02* | (2006.01) |

(Continued)

(52) U.S. Cl.
CPC .......... *A01G 13/0268* (2013.01); *B32B 5/022* (2013.01); *B32B 5/06* (2013.01);
(Continued)

(58) Field of Classification Search
CPC ............ A01G 13/0268; A01G 13/0256; A01G 13/0275; B32B 5/022; B32B 5/06; B32B 5/22
(Continued)

(56) References Cited

U.S. PATENT DOCUMENTS

| | | | |
|---|---|---|---|
| 4,895,904 A | 1/1990 | Allingham | |
| 2005/0178056 A1* | 8/2005 | Morrone | ............ A01G 13/0268 47/9 |

(Continued)

FOREIGN PATENT DOCUMENTS

| | | | | |
|---|---|---|---|---|
| EP | 0398243 A1 | 11/1990 | | |
| EP | 1378337 A1 * | 1/2004 | ............. | H01L 35/10 |

(Continued)

OTHER PUBLICATIONS

International Search Report and Written Opinion of corresponding application PCT/US2016/016620 dated Apr. 19, 2016, all enclosed pages cited.

(Continued)

*Primary Examiner* — Monica L Barlow
*Assistant Examiner* — Aaron M Rodziwicz
(74) *Attorney, Agent, or Firm* — Burr & Forman LLP

(57) ABSTRACT

Fabrics suitable for a wide variety of uses, including coverage of crops, crop planting sites, or both, are disclosed. The fabrics may comprise at least one spunbond layer comprising filaments including a filler. The at least one spunbond layer may comprise a basis weight of least about 12 grams-per-meter-squared and the at least one spunbond layer may comprise an average transmittance value within the photosynthetic active radiation (PAR) across wavelengths 400 nm to 700 nm comprising about 37% or less. Methods of enhancing crop growth are also disclosed.

20 Claims, 8 Drawing Sheets

Related U.S. Application Data

(60) Provisional application No. 62/111,972, filed on Feb. 4, 2015.

(51) Int. Cl.
*B32B 5/22* (2006.01)
*D04H 3/14* (2012.01)
*D04H 1/14* (2006.01)
*D04H 3/007* (2012.01)
*A01G 9/14* (2006.01)

(52) U.S. Cl.
CPC ................ *B32B 5/22* (2013.01); *B32B 5/26* (2013.01); *D04H 1/14* (2013.01); *D04H 3/007* (2013.01); *D04H 3/14* (2013.01); *D04H 3/16* (2013.01); *A01G 2009/1453* (2013.01); *B32B 2255/02* (2013.01); *B32B 2262/0207* (2013.01); *B32B 2262/0253* (2013.01); *B32B 2264/02* (2013.01); *B32B 2264/10* (2013.01); *B32B 2264/12* (2013.01); *B32B 2307/724* (2013.01); *B32B 2410/00* (2013.01); *Y02A 40/25* (2018.01)

(58) Field of Classification Search
USPC .............................................................. 47/9
See application file for complete search history.

(56) References Cited

U.S. PATENT DOCUMENTS

| | | | |
|---|---|---|---|
| 2010/0229462 A1* | 9/2010 | Garcia | A01G 13/0275 47/9 |
| 2012/0047799 A1* | 3/2012 | Stallaert | A01F 25/02 47/9 |
| 2013/0019523 A1* | 1/2013 | Cruickshank | B32B 5/16 47/9 |
| 2013/0031832 A1 | 2/2013 | Baker et al. | |

FOREIGN PATENT DOCUMENTS

| | | |
|---|---|---|
| EP | 1378337 A1 | 1/2004 |
| JP | 2001148951 A | 6/2001 |

OTHER PUBLICATIONS

Second Written Opinion of the International Preliminary Examining Authority of corresponding application PCT/US2016/016620 dated Dec. 23, 2016, all enclosed pages cited.

International Preliminary Report on Patentability of corresponding International Application No. PCT/US2016/016620, dated Apr. 25, 2017, all enclosed pages cited.

* cited by examiner

FABRICS CONTAINING A FILLER AND METHODS OF ENHANCING CROP GROWTH

CROSS-REFERENCE TO RELATED APPLICATIONS

This application is a divisional of U.S. patent application Ser. No. 15/015,987 filed Feb. 4, 2016, which claims priority to U.S. Provisional Patent Application No. 62/111,972 filed Feb. 4, 2015, and claims the benefit of the its earlier filing date under 35 U.S.C. 119(e); each of U.S. patent application Ser. No. 15/015,987 and U.S. Provisional Patent Application No. 62/111,972 are incorporated herein by reference in their entirety.

TECHNICAL FIELD

The presently-disclosed invention relates generally to fabrics including at least one filler material therein. The fabrics may be utilized to enhance crop growth at a crop planting site.

BACKGROUND

Crop covers have been used commercially in the agriculture field to enhance plant growth for decades. Materials for crop covers, such as films, nonwovens, or woven materials, may be placed above a crop planting site to protect the site from birds, insects, rain, hail, wind and excessive sun. For example, woven or film crop covers are used in the agriculture field for a variety of purposes, such as weed suppression and soil retention.

In some instances, thermal nonwovens are utilized as crop covers which are designed to let rain and irrigation through, while holding in heat. Accordingly, such nonwovens can typically be utilized to prevent freezing of a crop or plant to extend growing and/or selling seasons.

There at least remains a need, however, in the art for a cost-effective, high performance nonwoven fabric suitable for crop coverage applications for improving yield in a variety of climates.

BRIEF SUMMARY

One or more embodiments of the invention may address one or more of the aforementioned problems. Certain embodiments of the invention, for example, provide nonwoven fabrics containing at least one filler therein. For instance, certain embodiments of the invention comprise a fabric including at least one spunbond layer (e.g., having a thickness from about 3 mils to about 10 mils) comprising a plurality of filaments. In at least a portion (or all) of the filaments of the at least one spunbond layer include one or more fillers therein. In certain embodiments of the invention, the one or more fillers may be completely contained (e.g., the filler does not protrude from the sides of the filaments) within the filaments. In certain other embodiments of the invention, however, the one or more fillers may at least partially protrude from the sides of the filaments. The at least one spunbond layer may comprise a variety of basis weights. In certain embodiments of the invention, for example, the fabric may comprise a basis weight of at least about 12 grams-per-meter-squared (gsm). In accordance with certain embodiments of the invention, an average transmittance within the photosynthetic active radiation (PAR) value across wavelengths 400 nm to 700 nm of the at least one spunbond layer comprises 37% or less (e.g., between about 25% and 35%). In accordance with certain embodiment of the invention, the fabric may further comprise an infrared radiation (IR)-transmittance value across wavelengths 7000 nm to 14000 nm of the fabric from about 10% to about 70% (e.g., about 40 to about 60%, about 10 to about 30%). In accordance with certain embodiments of the invention, the spunbond layer of the nonwoven fabric comprises a thermal point bonded spunbond. Nonwoven fabrics according to certain embodiments of the invention may comprises an air permeability of greater than about 1200 CFM.

In certain embodiments of the invention, the filaments may comprise from about 1 wt % to about 30 wt % of the filler (e.g., from about 3 wt % to about 25 wt % of the filler, from about 3 wt % to about 15 wt % of the filler, from about 3 wt % to about 10 wt % of filler). In certain embodiments of the invention, the filler may comprise organic particles, inorganic particles, and/or combinations thereof. In an embodiment of the invention, the filler may comprise s a polymer material having a melting point that exceeds the melting point of filaments of the spunbond layer. Additionally or alternatively, the filler may comprise, in accordance with certain embodiments of the invention, calcium carbonate, clay, talc, and/or any combination thereof. In one embodiment of the invention, the filler comprises an alkaline earth carbonate.

The filler, according to certain embodiments of the invention, may comprise a coated filler. In certain embodiments, the coated filler comprises a coating comprising at least one organic material. In an embodiment of the invention, the at least one organic material comprises one or more fatty acids, salts of fatty acids, esters of fatty acids, and/or any combination thereof. In certain embodiments of the invention, the at least one organic material may comprise stearic acid, stearate, ammonium stearate, calcium stearate and/or any combinations thereof.

Nonwoven fabrics according to certain embodiments of the invention may comprise one or more fillers, in which the filler may comprise an average particle size between about 1 micron to about 10 microns (e.g., between about 2 micron to about 6 microns).

The plurality of spunbond filaments, according to certain embodiments of the invention, may comprise one or more polyolefin polymers. In certain embodiments, the one or more polyolefin polymers comprise polypropylene, polyethylene, or a mixture of both. In an embodiment of the invention, the at least a portion of the spunbond filaments comprise polypropylene produced by a metallocene catalyst.

Nonwoven fabrics according to certain embodiments may further include at least a portion of the spunbond filaments comprise a blend of one or more polyolefin polymers and at least one elastomer. The spunbond filaments, in accordance with certain embodiments of the invention, comprise from about 0.1 wt % to about 30 wt % (e.g., including from about 0.1 wt % to about 20 wt %) of the at least one elastomer. In an embodiment of the invention, the at least one elastomer comprises a polypropylene-based elastomer comprising isotactic propylene repeat units and random ethylene units. The isotactic propylene repeat units, in an embodiment of the invention, comprise from about 70% to about 90% of the elastomer. In certain embodiments of the invention, the mixture/blend of the one or more polyolefin polymers and the at least one elastomer comprises a greater quantity of the one or more polyolefin polymers than the at least one elastomer.

In certain embodiments of the invention, at least a portion of the filaments of the nonwoven fabrics may comprise an ultraviolet stabilizer. In one embodiment of the invention, the nonwoven fabrics may comprise an ultraviolet coating disposed onto at least one surface of the fabric.

In another aspect, certain embodiments of the invention provide a method of enhancing crop growth. In some embodiments of the invention, the method may comprise covering a crop planting site with a filler-containing fabric as disclosed herein, in which the crop planting site comprises one or more crops planted thereon. In accordance with certain embodiments of the invention, the step of covering the crop planting site may comprise directly or indirectly applying the filler-containing fabric either prior to emergence of the one or more crops or after emergence of the one or more crops. Methods according to certain embodiments of the invention may comprise applying the fabric directly or indirectly over the crop planting site from between about 24 hours to 288 hours after emergence of the one or more crops. In certain embodiments of the invention, the methods may comprise applying the fabric directly or indirectly over the crop planting site from between about 24 hours to 288 hours after planting of the one or more crops.

In accordance with certain embodiments, the method may further comprise maintaining the fabric directly or indirectly over the top of the crop planting site for a total time duration comprising from about 200 hours to about 4400 hours (e.g., about 700-about 1800 hours). In one embodiment of the invention; the method may further comprise inspecting the one or more crops prior to expiration of the total time duration, for example, by removing at least a portion of the fabric, viewing the one or more crops, and re-applying the fabric directly or indirectly over the top of the crop planting site. In accordance with certain embodiments of the invention, the method may further comprise harvesting the one or more crops. In methods according to certain embodiments of the invention, the one or more crops may comprise field crops, crops within a greenhouse, and/or crops within a macro-tunnel. In one embodiment, the one or more crops comprise vegetables. The one or more crops according to an embodiment of the invention may comprise melons. In one embodiment of the invention, the one or more crops may comprise potatoes.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 14:
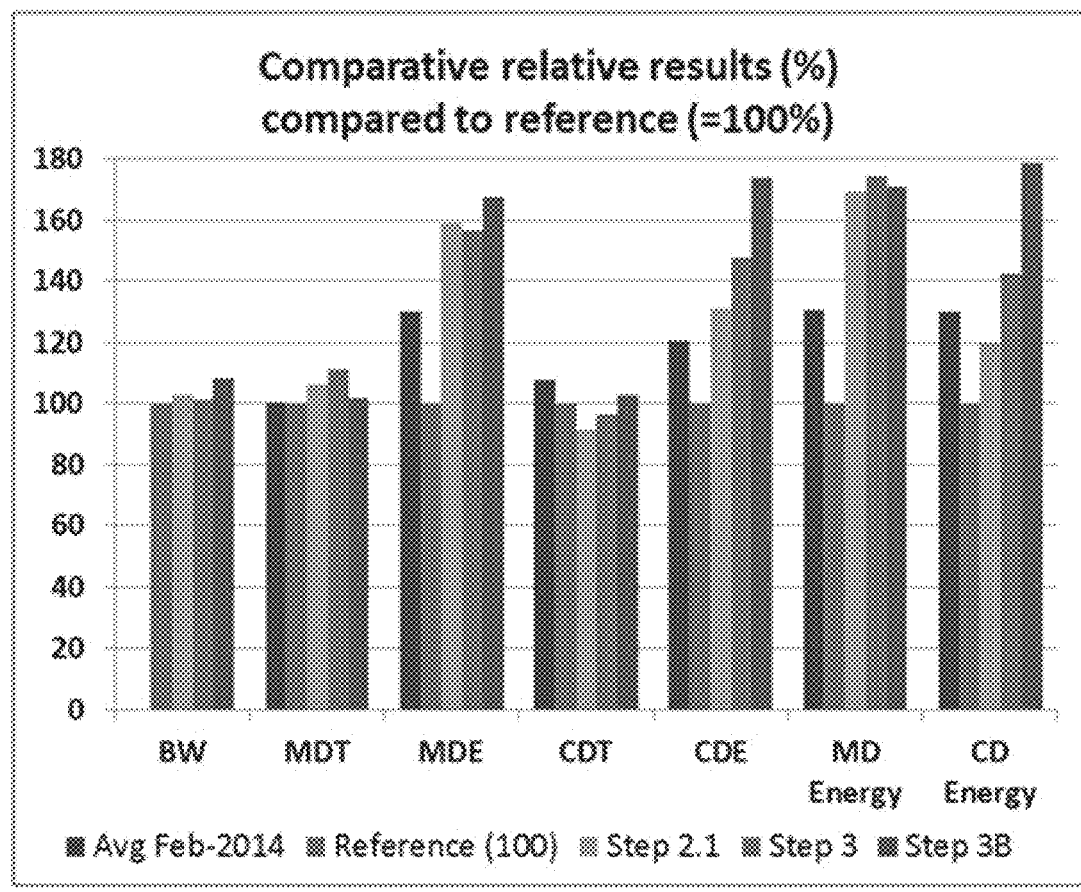

FIGS. 13A-13F illustrate the visual differences in nonwoven fabrics having varying amounts of filler, according to various embodiments of the invention, compared to a nonwoven fabric having no filler; and FIG. 14 illustrates various mechanical properties for a standard polypropylene spunbond fabric substantially free of filler and a calcium carbonate-containing polypropylene spunbond including about 12 wt % (15 wt % masterbatch that is 80% loaded with calcium carbonate) of calcium carbonate according to an embodiment of the invention.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Certain embodiments of the invention provide a fabric (e.g., a spunbond fabric or fabric comprising a spunbond layer) that includes a filler material dispersed throughout at least a portion of the filaments forming the fabric. In certain embodiments of the invention, the fabric may be used as a crop cover for a variety of crops. In this regard, certain embodiments of the invention may provide methods of enhancing crop growth in which a fabric, in accordance with certain embodiments of the invention disclosed herein, may be applied directly or indirectly over a crop planting site having one or more varieties of crops planted thereon. Coverage of a crop planting site with certain fabrics disclosed herein may provide one or more agronomical benefits (e.g., increased yield, earliness, precocity, etc.).

The term "filler", as used herein, may comprise particles or aggregates of particles and other forms of materials that can be added to a polymeric blend. According to certain embodiments of the invention, a filler will not substantially chemically interfere with or adversely affect the meltspinning of polymeric filaments. Fillers may comprise, for example, particulate inorganic materials such as, for example, calcium carbonate; various kinds of clay, silica, alumina, barium sulfate, sodium carbonate, talc, magnesium sulfate, titanium dioxide, zeolites, aluminum sulfate, cellulose-type powders, diatomaceous earth; magnesium sulfate; magnesium carbonate, barium carbonate, kaolin, mica, carbon, calcium oxide, magnesium oxide, aluminum hydroxide, glass particles, and the like, and organic particulate materials such as high-melting point polymers (e.g., TEFLON® and KEVLAR® from E.I. DuPont de Nemours and Company), pulp powder, wood powder, cellulose derivatives, chitin and chitin derivatives, and the like. Filler particles may additionally include fertilizers, according to certain embodiments of the invention. Filler particles may optionally be coated with a compound that may assist with the processing of the filler particles. Indeed, according to certain embodiments of the invention, the filler particles may be coated with a carboxylic acid. In an embodiment of the invention, the filler particles may be coated with a fatty acid including salts and esters thereof. For example, without intending to be limiting, the fatty acid may comprise stearic acid and/or reduced stearic acid, or a larger chain fatty acid, such as behenic acid (also known as docosanoic acid). Without intending to be bound by theory, coated filler particles may facilitate the free flow of the particles (in bulk) and their ease of dispersion into the polymer melt that may be meltspun into filaments.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantiomers; and/or any chiral molecular configuration of such polymer or polymeric material. These configurations include, but are not limited to, isotactic, syndiotacic, and atactic configurations of such polymer or polymeric material including any combinations thereof.

The term "polyolefin", as used herein, may comprise any of a class of polymers produced from a simple olefin (e.g., an alkene the general formula $C_nH_{2n}$) as a monomer. The term "polyolefin", in some embodiments of the invention, may more specifically comprise poly-α-olefins. Exemplary polyolefins include, for example, polyethylene, polypropylene, or copolymers thereof.

The terms "elastomer" or "elastomeric", as used interchangeably herein, may comprise any material that upon application of a biasing force, can stretch to an elongated length of at least 110% or even to 125% of its relaxed, original length (i.e., can stretch to at least 10% or even 25% more than its original length), without rupture or breakage. Upon release of the applied force, for example, the material may recover at least 40%, at least 60%, or even at least 80% of its elongation. In certain embodiments of the invention, the material may recover from about 20% to about 100% of its elongation, from about 25% to about 95% of its elongation, from about 30% to about 90% of its elongation, from about 40% to about 80% of its elongation, or from about 50% to about 70% of its elongation. For example, a material that has an initial length of 100 mm can extend at least to 110 mm, and upon removal of the force would retract to a length of 106 mm (e.g., exhibiting a 40% recovery). Exemplary elastomers may include VISTAMAXX™ propylene-based elastomers (commercially available form ExxonMobile), which comprise copolymers of propylene and ethylene. VISTAMAXX™ propylene-based elastomers, for example, comprise isotactic polypropylene microcrystalline regions and random amorphous regions.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, hydroentangling, air-laid, and bonded carded web processes.

The term "layer", as used herein, may comprise a generally recognizable combination of similar material types and/or functions existing in the X-Y plane.

The term "spunbond", as used herein, may comprise fibers which are formed by extruding molten thermoplastic material as filaments from a plurality of fine, usually circular, capillaries of a spinneret with the diameter of the extruded filaments then being rapidly reduced, these filaments forming a web by deposition on a moving belt and subsequently bonded. Spunbond fibers may generally not be tacky when they are deposited onto a collecting surface and may be generally continuous.

The term "substantial" may encompass the whole amount as specified according to certain embodiments of the invention, and largely but not the whole amount specified according to other embodiments.

The term "meltblown", as used herein, may comprise fibers formed by extruding a molten thermoplastic material through a plurality of fine die capillaries as molten threads or filaments and subjecting those threads or filaments to the effect of a high velocity, usually hot, gas (e.g. air) streams which attenuate the filaments of molten thermoplastic material to reduce their diameter, which may be to microfiber diameter, according to certain embodiments of the invention, According to an embodiment of the invention, for example, the die capillaries may be circular. Thereafter, the meltblown fibers may be carried by the high velocity gas stream and may be deposited on a collecting surface to form a web of randomly disbursed meltblown fibers. Meltblown fibers may comprise microfibers which may be continuous or discontinuous and may be generally tacky when deposited onto a collecting surface.

I. Fabric (e.g., Fabrics that May be Used in Crop Cover)

In one aspect, certain embodiments of the invention provide nonwoven fabrics containing at least one filler therein. For instance, certain embodiments of the invention comprise a fabric including at least one spunbond layer comprising a plurality of filaments. At least a portion, or optionally substantially all according to certain embodiments of the invention, of the filaments of the at least one spunbond layer include one or more fillers therein. In certain embodiments of the invention, the one or more fillers may be completely contained (e.g., the filler does not protrude from the sides of the filaments) within the filaments. In certain other embodiments of the invention, however, the one or more fillers may at least partially protrude from the sides of the filaments. The at least one spunbond layer may comprise a variety of basis weights. In certain embodiments of the invention, for example, the fabric may comprise a basis weight of least, for example, about 12 grams-per-meter-squared (gsm). In accordance with certain embodiments of the invention, an average transmittance value within the photosynthetic active radiation (PAR) across wavelengths 400 nm to 700 nm of the at least one spunbond layer comprises 37% or less.

In accordance with certain embodiments of the invention, the fabrics comprise properties that exhibit desirable thermicity for plant growth. Without intending to be bound by the theory, thermicity depends on a balance between solar radiation (e.g., mainly ultraviolet radiation, visible, and near infrared radiation), which may pass through the fabric and heats up the area underneath the fabric (e.g., a crop cover), and terrestrial radiation. Terrestrial radiation, for instance, is emitted back to the atmosphere in the long infrared (IR) range (e.g., 7000 to 14000 nm wavelengths) during the night or evening. Photosynthetic active radiation (PAR) between 400 and 700 nm are particularly useful wavelengths for the photosynthesis process of developing plants/crops. In this regard, fabrics according to certain embodiments of the invention exhibit a beneficial balance between transmittance within the PAR (e.g., light transmission between 400-700 nm) and blocking of IR radiation escaping into the atmosphere. For example, fabrics according to certain embodiments of the invention may be at least partially transparent into the PAR while generally (or at least partially) opaque to IR between wavelengths of 7000-14000 nm. According to an embodiment of the invention, both the type, size and concentration of filler material is selected to achieve a favorable transmittance within the PAR from about 400 nm to about 700 nm while substantially reducing IR radiation.

In certain embodiments of the invention, the fabric may comprise at least one spunbond layer. Additionally, certain embodiments of the invention may comprise additional layers formed by other methods of manufacturing nonwoven fabrics, such as meltblowing, hydroentangling, air-laying, electro-spinning, and bonded carded web processes, etc. In certain embodiments of the invention, however, the fabric may comprise only spunbond layers. In certain exemplary embodiments of the invention, the fabric may comprise or consist of a single spunbond layer. Further pursuant to this embodiment of the invention, the fabric may simply comprise a single spunbond layer alone. In accordance with certain embodiments of the invention, the fabric may comprise the at least one spunbond layer which has been thermal point bonded.

Fabrics in accordance with certain embodiments of the invention, may comprise a basis weight of least about 5 grams-per-meter-squared (gsm), 10 gsm, or 12 gsm. In certain embodiments of the invention, the basis weight of the fabric may comprise at least about any of the following: 5, 8, 10, 12, 15, and 17 gsm and/or at most about 40, 35, 30, 25, 20, and 18 wt % (e.g., about 12-17 gsm, 15-20 gsm, etc.). In certain embodiments of the invention, for example, the fabric may comprise or consist of a single spunbond layer in which the spunbond layer may comprise a basis weight of least about 5 grams-per-meter-squared (gsm), 10 gsm, or 12 gsm. In certain embodiments of the invention, the basis weight of the fabric may comprise at least about any of the following: 5, 8, 10, 12, 15, and 17 gsm and/or at most about 40, 35, 30, 25, 20, and 18 wt % (e.g., about 12-17 gsm, 15-20 gsm, etc.).

Fabrics according to certain embodiments of the invention may one or more layers each, for example, comprising a plurality of filaments having one or more polymers, such as one or more polyolefin polymers. In certain exemplary embodiments of the invention, the spunbond filaments forming one or more spunbond layers may comprise one or more polyolefin polymers comprising polypropylene, polyethylene, or a blend of both. In certain embodiments of the invention, for example, the filaments forming the spunbond layer may be formed from a single polymer, such as polypropylene. Further pursuant to this embodiment of the invention, for instance, the polyolefin polymer may consist of polypropylene. The one or more polymers utilized for the production of filaments, such as by a meltspinning process, may be formed from a variety of processes. By way of example only, the polyolefin polymer may comprise polypropylene produced by a metallocene-catalyst process.

In certain embodiments of the invention, fabric may comprise a plurality of filaments comprising a blend of one or more polyolefin polymers and at least one elastomer. Further pursuant to this embodiment of the invention, the filaments of, for example, the spunbond layer may comprise from about 0.1 wt % to about 30 wt % of at least one elastomer. As such, the filaments may comprise at least one elastomer from at least about any of the following: 0.1, 0.5, 1, 1.5, 2.0, 2.5, and 3 wt % and/or at most about 30, 20, 10, 5, 4, and 3 wt % (e.g., about 0.5-3 wt %, 2-3 wt %, etc.). In this regard, the polymer blend used for forming the filaments of the fabric may comprise a greater quantity (e.g., a majority) of one or more polyolefin polymers than the one or more elastomers.

Although the type of elastomer, according to certain embodiments of the invention, is not particularly limited, certain exemplary embodiments of the invention may comprise a polypropylene-based elastomer comprising isotactic propylene repeat units and random ethylene units. In certain embodiments of the invention, the polypropylene-based elastomer may comprise isotactic propylene repeat units comprising from about 70% to about 90% of the elastomer. Such exemplary elastomers may include VISTAMAXX™ propylene-based elastomers (commercially available form ExxonMobile), which comprise copolymers of propylene and ethylene. VISTAMAXX™ propylene-based elastomers, for example, comprise isotactic polypropylene microcrystalline regions and random amorphous regions.

In accordance with certain embodiments of the invention, the spunbond layer or layers may comprise filaments comprising an average diameter (or effective average diameter for non-circular filaments) from about 5 to about 30 microns. As such, the filaments of the spunbond layer or layers may comprise from at least about any of the following: 5, 7, 10, 15, and 20 microns and/or at most about 30, 25, and 20 wt % (e.g., about 7-20 microns, 5-25 microns, etc.).

In accordance with certain embodiments of the invention, the one or more of the filaments of the spunbond layer or layers may comprise a filler material therein. For example, the filler may comprise particles or aggregates of particles, which will not chemically interfere with or adversely affect the, for example, meltspun filaments. In at least a portion (or all) of the filaments of the spunbond layer or layers include one or more fillers therein. In certain embodiments of the invention, for example, the one or more fillers may be completely contained (e.g., the filler does not protrude from the sides of the filaments) within the filaments. In certain other embodiments of the invention, however, the one or more fillers may at least partially protrude from the sides of the filaments. Further pursuant to this embodiment of the invention, the filaments may comprise organic particles, inorganic particles, or a combination of both. In some embodiments of the invention, the filaments may comprise a polymer material having a melting point that exceeds the melting point of the polymer and/or elastomer forming the filaments of the spunbond layer(s). In certain exemplary embodiments of the invention, for instance, the filaments may comprise calcium carbonate, clay, talc, or any combination thereof.

In accordance with certain embodiments of the invention, for example, the filler may be formed from particulate inorganic materials such as, for example, calcium carbonate, various kinds of clay, silica, alumina, barium sulfate, sodium carbonate, talc, magnesium sulfate, titanium dioxide, zeolites, aluminum sulfate, cellulose-type powders, diatomaceous earth, magnesium sulfate, magnesium carbonate, barium carbonate, kaolin, mica, carbon, calcium oxide, magnesium oxide, aluminum hydroxide, glass particles, and the like, and organic particulate materials such as high-melting point polymers (e.g., TEFLON® and KEVLAR® from E.I. DuPont de Nemours and Company), pulp powder, wood powder, cellulose derivatives, chitin and chitin derivatives, and the like, or combinations thereof. In such embodiments of the invention, for instance, the filler may be an alkaline earth carbonate, such as calcium carbonate. Filler particles may additionally comprise one or more fertilizers, according to certain embodiments of the invention.

In certain embodiments of the invention, the filler may comprise a coated tiller. For instance, the filler may be partially or completely covered with a coating material. In certain embodiments of the invention, for example, the coating material may comprise at least one organic material. For example, the organic material may comprise one or more fatty acids, salts of fatty acids, esters of fatty acids, or any combination thereof. Exemplary and non-limiting organic coating materials stearic acid, stearate, ammonium stearate, calcium stearate or any combinations thereof.

In accordance with certain embodiments of the invention, the filaments (e.g., spunbond filaments) may comprise from about 1 wt % to about 30 wt % of the filler. As such, the filaments may comprise a filler (e.g., calcium carbonate) weight percent from at least about any of the following: 0.8, 1, 2.5, 3, 4, 5, 5.5, 7, 8, 9.5, 10, 12, and 15 wt % and/or at most about 30, 25, 24, 20, 16, 15, and 12 wt % (e.g., about 5-15 wt %, 3-25 wt %, 3-15 wt %, about 3-12 wt %, about 3-10 wt % etc.).

Figure 1A:
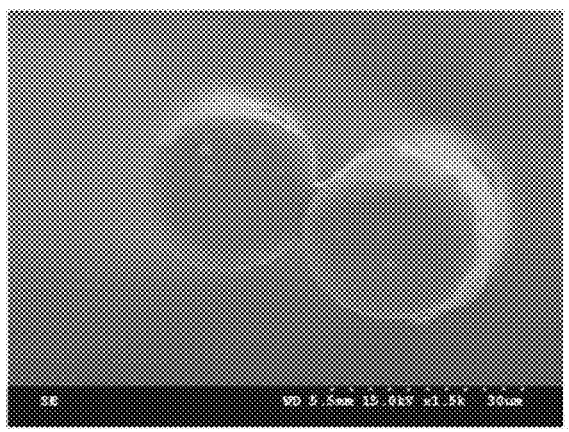
FIGS. 1A-1D illustrate cross-sectional scanning electron microscope (SEM) micrograph views of meltspun filaments including varying amounts of filler comprising calcium carbonate according to certain embodiments of the invention.
Figure 1B:
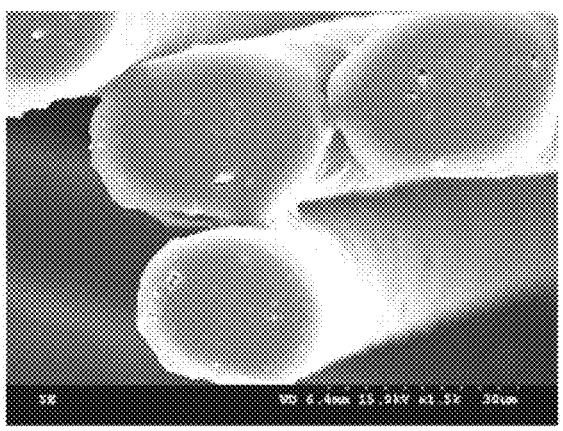
Figure 1C:
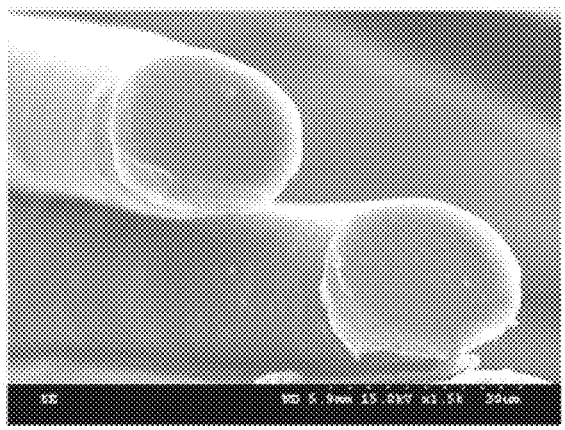
Figure 1D:
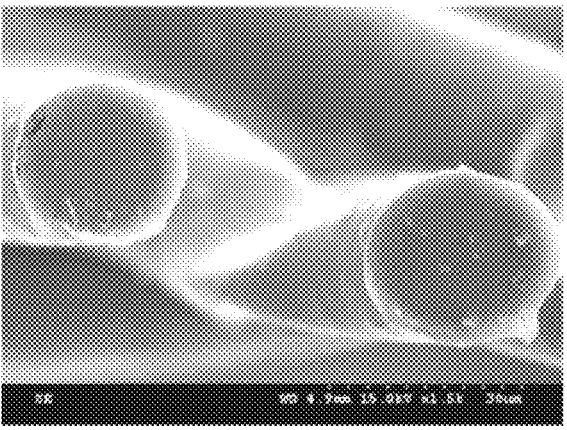
Figure 2:
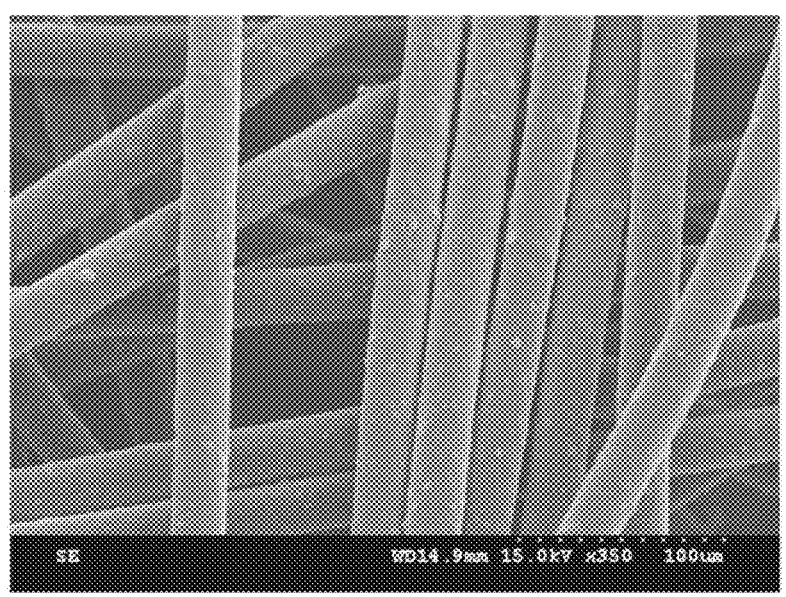
FIG. 2 illustrates a SEM micrograph view of meltspun filaments including about 12 wt % (15 wt % masterbatch that is 80% loaded with filler) of filler comprising calcium carbonate according to an exemplary embodiment of the invention.

FIGS. 1A-1D illustrate spunbond polypropylene filaments including varying amounts of a masterbatch comprising polypropylene and 80 wt % of filler comprising calcium carbonate. FIG. 1A illustrates spunbond polypropylene filaments including 5 wt % of the masterbatch (i.e., 4 wt % calcium carbonate). FIG. 1B illustrates spunbond polypropylene filaments including 8 wt % of the masterbatch (i.e., 6.4 wt % calcium carbonate). FIG. 1C illustrates spunbond polypropylene filaments including 12.5 wt % of the masterbatch (i.e., 10 wt % calcium carbonate). FIG. 1D illustrates spunbond polypropylene filaments including 15 wt % of the masterbatch (i.e., 12 wt % calcium carbonate at an 80% loading of calcium carbonate in the masterbatch). FIG. 2 also illustrates spunbond polypropylene filaments including 15 wt % of the masterbatch (i.e., 12 wt % calcium carbonate at an 80% loading of master batch). FIG. 2 illustrates an exemplary embodiment of the invention in which at least a portion of the filler protrudes from the outer surfaces of the filaments.

The filler, according to certain embodiments of the invention, may comprise an average particle size (or agglomeration of particles) from about 1 micron to about 10 microns. As such, the filler may comprise an average particle size (or agglomeration of particles) from at least about any of the following: 1, 2, 3, 4, 5, and 6 microns and/or at most about 10, 9, 8, and 7 microns (e.g., about 1-5 microns, 2-6 microns, etc.).

As noted above, fabrics according to certain embodiments of the invention may be partially transparent to PAR. For instance, exemplary fabrics may comprise an average PAR-transmittance value (e.g., average percentage of light that pass through the fabric across wavelengths 400 nm through 700 nm) comprising 40% or less, 37% or less, 35% or less, or 33% or less. In this regard, certain embodiments comprise an average PAR-transmittance value from at least about any of the following: 20, 25, 30, and 32% and/or at most about 40, 37, 35, and 33% (e.g., about 20-40%, 25-35%, etc.).

In accordance with certain embodiments of the invention, the fabrics may comprise an infrared radiation (IR)-transmittance value across wavelengths 7000 nm to 14000 nm of the fabric comprising from about 10% to about 70%. As such, the fabric may comprise an infrared radiation (IR)-transmittance value across wavelengths 7000 nm to 14000 nm of the fabric comprising from at least about any of the following: 5, 10, 15, 20, 25, and 30% and/or at most about 90, 80, 70, 60, 50, 40, and 30% (e.g., about 40-60%, 10-30%, etc.).

The thickness of the fabrics according to certain embodiments of the invention may comprise from about 1 to about 20 mils. In this regard, the thicker fabric may exhibit more robustness (e.g., resistance to abrasion, etc.) and/or blockage of IR across wavelengths 7000 nm to 14000 nm. Exemplary fabrics, for instance, may comprise a thickness comprising from at least about any of the following: 1, 2, 3, 5, and 10 mils and/or at most about 20, 15, 12, and 10 mils (e.g., about 3-10 mils, 5-10 mils, etc.

In accordance with certain embodiments of the invention, the fabric may also comprise one or more commercially available ultraviolet (UV) stabilizers. In certain embodiments of the invention, for instance, the UV stabilizers may be incorporated into the individual filaments of the fabric by adding the UV stabilizers within the melt that may be meltspun for formation of the filaments. In this regard, the filaments of the fabric may comprise from about 100 ppm to about 1500 ppm of one or more UV stabilizers. In certain other embodiments of the invention, the filaments of the fabric may comprise from about 3000 ppm to about 6000 ppm of one or more UV stabilizers Filaments of certain exemplary embodiments of the invention may comprise one or more UV stabilizers comprising from at least about any of the following: 100, 200, 300, 500, and 600 ppm and/or at most about 1500, 1200, 1000, 800 and 600 ppm (e.g., about 300-800 ppm, 500-600 ppm, etc.). Filaments of certain exemplary embodiments of the invention may comprise one or more UV stabilizers comprising from at least about any of the following: 3000, 4000, 5000, and 6000 ppm and/or at most about 4000, 5000, and 6000 ppm (e.g., about 3000-6000 ppm, 3500-5500 ppm, etc.). Additionally or alternatively, the fabric may comprise an ultraviolet coating disposed onto at least one surface of the fabric and/or spunbond layer.

Fabrics according to certain embodiments of the invention may also comprise an air permeability comprising at least about 800 CFM, 1000 CFM, or 1200 CFM. Exemplary fabrics, for instance, may comprise an air permeability comprising from at least about any of the following: 800, 1000, and 1200 CFM and/or at most about 1500, 1400, 1320, 1300, 1260, and 1250 CFM (e.g., about 1000-1300 CFM, 1200-1260 CFM, etc.).

In another aspect, certain embodiments of the invention of the disclosure provide methods for forming fabrics disclosed herein. For example, an exemplary method may comprise forming a polymeric blend or melt that is meltspun to form a plurality of filaments. The polymeric blend or melt may comprise one or more polyolefin polymers, one or more elastomers, one or more fillers, and optionally a variety of other additives. For instance, the filler material can be added to the polymeric blend or melt prior and agitated or mixed therein prior to meltspinning the polymeric blend or melt. In certain exemplary embodiments of the invention, the polymeric blend or melt may be meltspun to provide a plurality of filaments and deposited onto a moving belt to form a web. The formed web may be subsequently bonded, such as by thermal bonding.

II. Methods of Enhancing Crop Growth

In another aspect, certain embodiments of the invention provide a method of enhancing crop growth. For example, the method may comprise covering a crop planting site with a fabric, such as a fabric according to certain embodiments of the invention disclosed herein, in which the crop planting site comprises one or more crops planted thereon. In accordance with certain embodiments of the invention, the step of covering the crop planting site comprises applying the fabric directly or indirectly over the crop planting site either prior to emergence or after emergence of the one or more planted crops. For instance, the fabric may be placed directly onto or over a wire-structure located on the crop planting sites, such that the fabric may not be directly contact the ground or crops of the crop planting site.

As referenced above, fabrics according to certain embodiments of the invention for uses in methods disclosed herein may comprise properties that exhibit desirable thermicity for plant growth. For example, thermicity depends on a balance between solar radiation (e.g., mainly ultraviolet radiation, visible, and near infrared radiation), which may pass through the fabric and heats up the area underneath the fabric (e.g., a crop cover), and terrestrial radiation. Terrestrial radiation, for instance, is emitted back to the atmosphere in the long infrared (IR) range (e.g., 7000 to 14000 nm wavelengths) during the night or evening. Photosynthetic active radiation (PAR) between 400 and 700 nm is particularly useful wavelengths for the photosynthesis process of developing plants/crops. In this regard, fabrics according to certain embodiments of the invention exhibit a beneficial balance between transmittance (e.g., light transmission between 400-700 nm) within the PAR and blocking of IR radiation escaping into the atmosphere. For example, fabrics according to certain embodiments of the invention may be at least partially transparent into PAR while generally (or at least partially) opaque to IR between wavelengths of 7000-14000 nm In accordance with certain embodiments of the invention, the method may comprise applying the fabric directly or indirectly over the crop planting site from between about 24 hours to 288 hours after emergence of the one or more crops. In certain exemplary embodiments of the invention, the methods may comprise applying the fabric directly or indirectly over the crop planting site at least about any of the following: 24, 48, 72, and 96 hours after emergence of the one or more crops and/or at most about 288, 250, 200, and 150 hours after emergence of the one OF more crops.

In accordance with certain other embodiments of the invention, the step of covering the crop planting site comprises applying the fabric directly or indirectly over the crop planting site from between about 24 hours to 288 hours after planting of the one or more crops. In certain exemplary embodiments of the invention, the methods may comprise applying the fabric directly or indirectly over the crop planting site at least about any of the following: 24, 48, 72, and 96 hours after planting of the one or more crops and/or at most about 288, 250, 200, and 150 hours after planting of the one or more crops.

Methods according to certain embodiments of the invention may comprise maintaining the fabric directly or indirectly over the top of the crop planting site for a total time duration comprising from about 200 hours to about 4400 hours, or from about 700 hours to about 1800 hours. In certain exemplary embodiments of the invention, the methods may comprise maintaining the fabric directly or indirectly over the top of the crop planting site for a total time duration comprising from at least about any of the following: 100, 200, 400, 700, and 900 hours and/or at most about 4400, 3600, 2800, 2200, 2000, 1800, 1500, and 1200 hours. In certain embodiments of the invention, the methods may further comprise inspecting the one or more crops prior to expiration of the total time duration. For instance, the step of inspecting the one or more crops may comprise temporarily removing at least a portion of the fabric, viewing the one or more crops, and re-applying the fabric directly or indirectly over the top of the crop planting site. The inspection of the crops may provide an opportunity to gauge growth of the crops, disease levels, and growth of any unwanted vegetation. In accordance with certain embodiments of the invention, the method may further comprise harvesting the one or more crops.

In accordance with certain embodiments of the invention, the one or more crops may comprise a variety of crops/plants. In certain embodiments of the invention, for instance, the crops may comprise field crops, crops located within a greenhouse, crops located within a macro-tunnel structure and combinations thereof. Exemplary crops, according to certain embodiments of the invention, include (but not limited to) vegetables, a variety of melons, peppers, cucumbers, watermelon, leaks, endives, ornamentals, etc.

Methods in accordance with certain embodiments of the invention, may provide or comprise an increase in crop yield (e.g., based on dry biomass) as compared to methods using a crop cover (e.g., nonwoven fabric) of the same basis weight and same construction, but being devoid of filler as disclosed herein. In certain embodiments of the invention, the methods may comprise an increase in crop yield e.g., based on dry biomass of at least about any of the following: 3, 5, 8, 10, 12, and 15% increase, and/or at most about 20, 18, and 15% increase (e.g., about 5-15%, 10-18%, etc.).

Methods in accordance with certain embodiments of the invention, may provide or comprise an increase in earliness (e.g., faster growth) for the planted crops, which may further provide the option to shorten the vegetation growth cycle, as compared to methods using a crop cover (e.g., nonwoven fabric) of the same basis weight and same construction, but being devoid of filler as disclosed herein. For instance, the earliness of the plant growth may be evaluated by the number of days for the planted crop to reach a certain size or height of growth. In this regard, certain embodiments of the invention may provide a difference in earliness from about 1 to about 20 days as compared to methods using a crop cover (e.g., nonwoven fabric) of the same basis weight and same construction, but being devoid of filler as disclosed herein. For example, the plant growth associated with the fabric according to certain embodiments of the invention may grow to the predetermined growth level (e.g., height, weight, etc.) from about 1 to about 20 days prior to plant growth associated with fabrics of the same basis weight and same construction, but being devoid of filler as disclosed herein. In certain embodiments of the invention, the methods may comprise an increase in earliness for a given height of emergence of at least about any of the following: 1, 3, 5, 10, 15, and 20 days and/or at most about 20, 18, 15, and 10 days (e.g., about 3-15 days, 10-20 days, etc.

Examples

The present disclosure is further illustrated by the following examples, which in no way should be construed as being limiting. That is, the specific features described in the following examples are merely illustrative and not limiting.

(1) Experimental Field Study

An experimental study was conducted to test how two types of crop covers influence temperature and growth of a commercial cultivar of potato, "Gulloye", in the very northern part of Europe (i.e., Norway). The aim of the experimental study was to illustrate if filler-containing fabrics in accordance with certain embodiments of the present disclosure impact the growth of crops (e.g., potatoes) in comparison to the use of commercially available crop covers. In particular, a filler-containing fabric in accordance with one embodiment of the invention of the present disclosure was compared to (i) REICROP® (a polypropylene spunbond fabric commercially available from Polymer Group, Inc.) and (ii) a control (i.e., a crop planting site without a crop cover). The filler-containing fabric in accordance with one embodiment of the invention and the REICROP® fabric each had a basis weight of 17 gsm.

Figure 3:
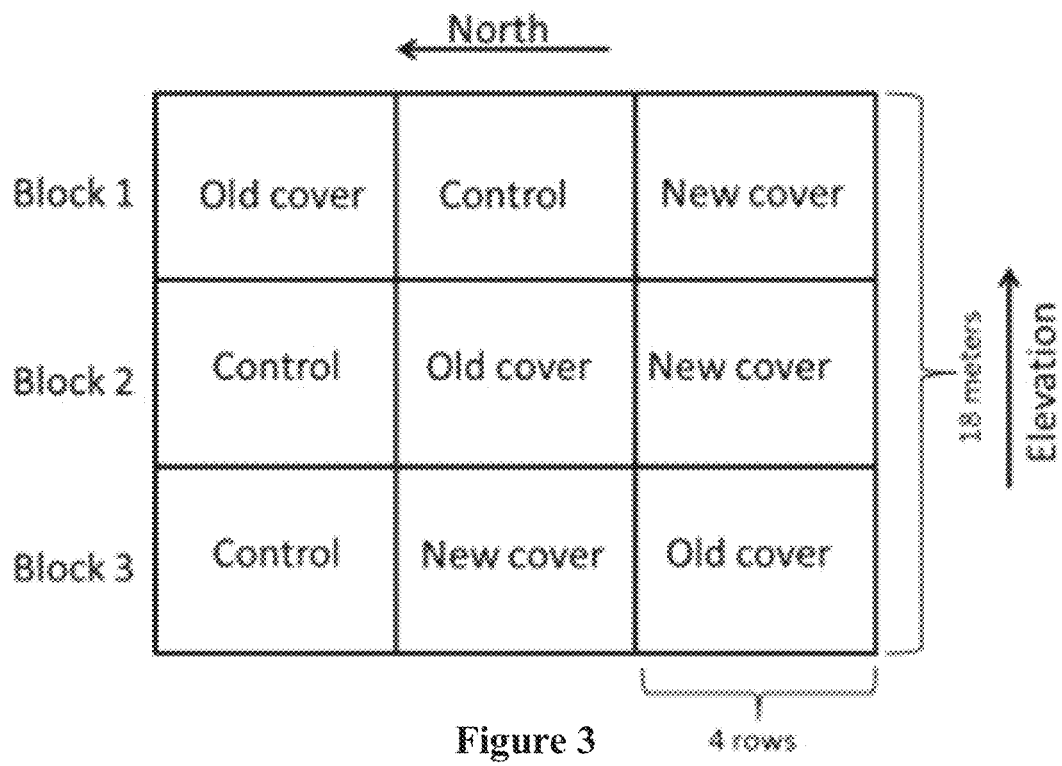
FIG. 3 illustrates a plot layout for an experimental field study for testing an embodiment of the inventive nonwoven.

More specifically, the Norwegian potato cultivar "Gulloye" was used as a model organism for the experiment. "Gulloye" is a traditional cultivar in northern Norway, known for its quality as a gourmet potato. The experimental study took place at the research farm of Bioforsk Nord, in Tromso (69°39'11.0"N 18°5440 15.3"E). A Latin square design with three replicates (blocks) was used to test differences in emergence, maturity, crop yield and dry weight, as well as temperature in soil and air for plots with no cover, REICROP® and a filler-containing fabric. The potato field was split into nine (9) plots, with each treatment replicated in a random manner in three blocks (stratified by elevation level). The plot layout for the experimental study is illustrated in FIG. 3. The treatment was categorized as control (no cover), commercial cover type (i.e., REICROP®), and a filler-containing fabric in accordance with one embodiment of the present disclosure. Each plot consisted of four rows of six meter plus guard plants. Tubers were planted with a semi-automatic planter with a space of 30 cm between tubers and 72 cm between rows.

The tubers where planted on May 27th, just after soil was thawed. The crop covers where applied on June 4$^{th}$ and removed on August 15$^{th}$, Only minor amounts of weeds were present in the field, and were manually removed from the field in mid-July. The tubers were harvested on September 1st. In general, disease levels in potato farming in northern Norway are low, and visual inspection did not indicate any differences among the treatments with respect to disease level.

Surface temperatures (5 cm above ground) and soil temperatures (5 cm below surface) were registered using iButton loggers (Thermochron 8 K 40/85C). The logging interval was set to every hour, and a total of 57,651 temperatures were logged. The loggers were tested and calibrated for four days before the start of the experimental study. One of the loggers (ID 2CA positioned above ground, on a REICROP® cover) failed recording and was replaced 19$^{th\ July}$.

After emergence of the plants (about 20 cm height on the best plot), emergence was estimated visually by giving a score ranging from 1-9. A score of 1 represents zero plant emergence, and 9 represents an even plant stand of about 20 cm height.

Crop estimates were obtained by weighing the total crop amount of the two middle rows (each of 6 m) in each plot to avoid edge effects. Each harvested row equaled an area of 4.32 m$^2$. Dry matter content was measured using specific gravity (sample weight in air and sample weight in water).

(a) Statistical Analysis

Differences in temperature, emergence and yield for the different treatments were tested using general mixed models (function lmer in R). Block was including as random factor to control for random variation do to elevation. As performance of the filler-containing fabric in accordance with one embodiment of the present disclosure was in focus, this was set as reference level for the contrast analysis. For temperature, data was log-transformed to obtain a normal distribution. As emergence score is a discrete measure, Poisson distribution with a log-link was assumed. Differences among treatments were considered significant when their 95% confidence intervals did not overlap zero. All analyses were done in the statistical package R version 3.0.1, library base and lme4. Differences in temperature variation were tested by Fischer's F-test of variance ratios (function var. test in R).

(b) Temperature Results

Figure 4A:
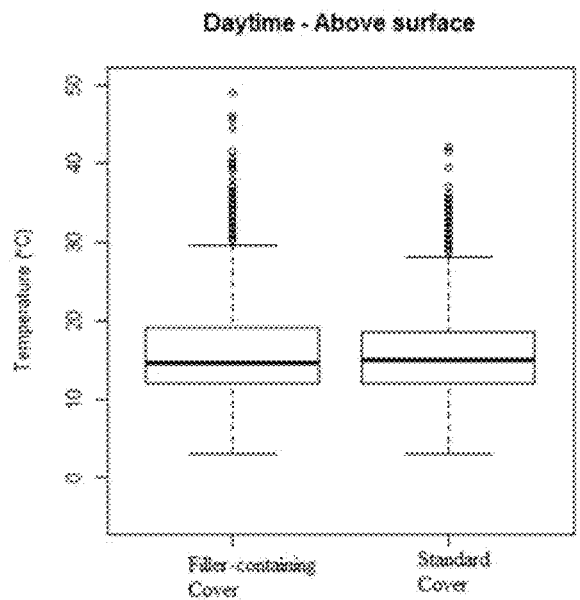
FIGS. 4A-4D illustrate boxplots of surface and soil temperature (not controlled for random factors) for different field treatments, at day (06:00-18:00) and night (18:00-06:00), respectively, in which the boxes represent the 25-75 quantil range, the solid black line the median and the whiskers represent 1.5 interquantil range while outliers are marked as dots.
Figure 4B:
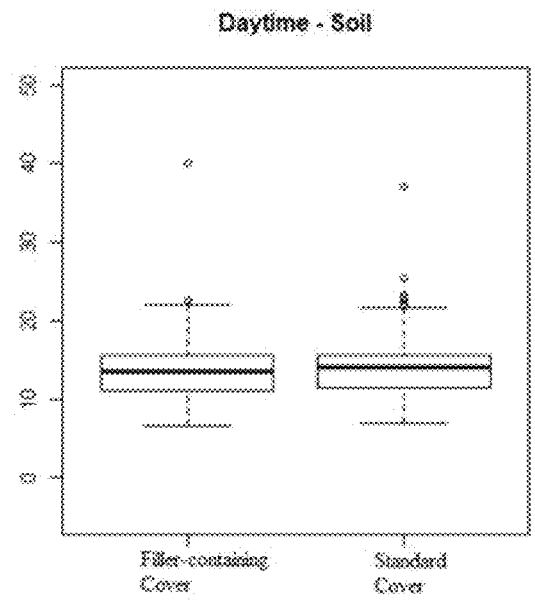
Figure 4C:
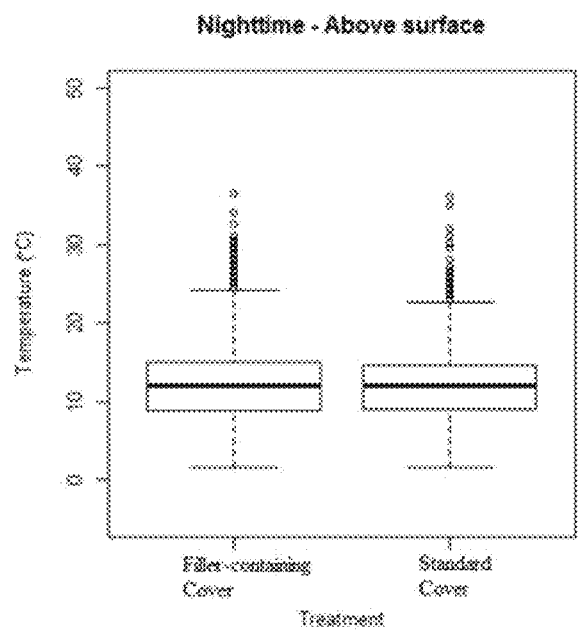
Figure 4D:
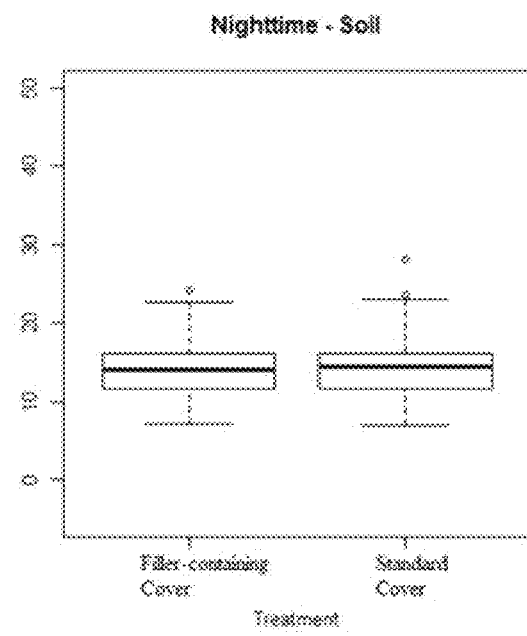

Ambient average July temperature was above the overall average measured at the field station in the period 1995-2013 (15.2° C. vs. 12.16° C.). The covered plots showed increased temperatures compared to the control as illustrated in Table 1. Above ground temperatures in plots with the filler-containing fabric in accordance with one embodiment of the present disclosure did not differ significantly from the REICROP® cover (0.14.51° C. (95% CI: 14.07-14.98° C.) versus 14.17° C. (95% CI: 14.01-14.93° C.). For soil temperatures the pattern was similar; with no significant difference in temperatures for the filler-containing fabric in accordance with one embodiment of the present disclosure compared to REICROP®: 13.24° C. (95% CI: 12.85-13.65° C.' versus 13.47° C. (95% CI: 13.06-13.88° C.). This relationship was not altered comparing day (06:00-18:00) and night (18:00-06:00) temperatures as shown in FIGS. 4A and 4B and in FIGS. 4C and 4D. For air temperatures, there was a small but significant higher variation in temperature for the filler-containing fabric in accordance with one embodiment of the present disclosure compared to REICROP® fabric (ratio day time, 95% CI: 1.02-1.17, ratio night time, 95% CI: 1.011.17, as shown in Table 1). The means and standard deviation of temperatures among the different treatments, for soil and air temperatures at day (06:00-18:00) and night (18:00-06:00) times are provide in Table 1. The relative variation (coefficient of variation, CV) of Table 4 is given by standard deviation divided on mean.

TABLE 1

| Parameter | Mean | Standard Deviation | CV |
|---|---|---|---|
| Above Surface Temperature, daytime (° C.) | | | |
| Control | 14.30 | 5.68 | 0.40 |
| New cover type (contains filler) | 15.76 | 6.04 | 0.38 |
| Old cover type (no filler) | 15.77 | 5.76 | 0.36 |
| Above Surface Temperature, nighttime (° C.) | | | |
| Control | 11.68 | 4.60 | 0.39 |
| New cover type (contains filler) | 12.38 | 4.89 | 0.39 |
| Old cover type (no filler) | 12.31 | 4.68 | 0.38 |

TABLE 1-continued

| Parameter | Mean | Standard Deviation | CV |
|---|---|---|---|
| Soil Temperature, daytime (° C.) | | | |
| Control | 12 80 | 3.19 | 0.25 |
| New cover type (contains filler) | 13.61 | 2.95 | 0.22 |
| Old cover type (no filler) | 13.76 | 2.89 | 0.21 |
| Soil Temperature, nighttime (° C.) | | | |
| Control | 13.40 | 3.32 | 0.23 |
| New cover type (contains filler) | 14.07 | 3.11 | 0.22 |
| Old cover type (no filler) | 14.37 | 3.11 | 0.22 |

(c) Modality of Above Ground Biomass

Visual inspection early in the growth season (mid-July) indicated differences in emergence between the uncovered versus covered plots, where plots showed higher and more developed plants. There was higher emergence scores for the filler-containing fabric in accordance with one embodiment of the present disclosure compared to the REICROP® cover: 8 (95% CI: 5.21-11.64) versus 7.33 (95% CI: 4.68-10.84). At harvest, there was no difference in degree of maturity, indicated by percentage of yellow haulm (less green) for the filler-containing fabric (e.g., new cover type) compared to the standard REICROP® cover (e.g., old cover type): 63.33 (95% CI: 58.02-68.66) versus 63.33 (58.00-68.66) as illustrated in Table 2.

TABLE 2

| Response | Predictor | Estimate | SE | 95% CI |
|---|---|---|---|---|
| Germination score (1-9) (n = 9) (log transformed) | Intercept | 2.08 | 0.20 | (1.65, 2.45) |
| | Control | −0.69 | 0.35 | (−1.42, −0.01) |
| | Old Cover | −0.09 | 0.30 | (−0.67, 0.49) |
| | Block (random) | 0 | | |
| Percentage Green (%) (n = 9) | Intercept | 63.33 | 2.89 | (58.00, 68.66) |
| | Control | 18.33 | 3.60 | (11.52, 25.15) |
| | Old Cover | −1.42 × 10$^{-14}$ | 3.60 | (−6.81, 6.81) |
| | Block (random) | 2.37 | | |
| | Residual (random) | 4.41 | | |
| Crop Size (kg/row) (n = 18) | Intercept | 16.08 | 0.51 | (15.13, 17.04) |
| | Control | 0.22 | 0.68 | (−1.10, 1.53) |
| | Old Cover | −2.02 | 0.68 | (−3.33, −0.70) |
| | Block (random) | 0.28 | | |
| | Residual (random) | 1.18 | | |
| Percentage dry matter (%) (n = 9) | Intercept | 25.43 | 0.43 | (24.57, 26.29) |
| | Control | −0.63 | 0.44 | (−1.47, 0.21) |
| | Old Cover | −0.23 | 0.44 | (−1.07, 0.61) |
| | Block (random) | 0.52 | | |
| | Residual (random) | 0.54 | | |

Table 2 provides the parameter estimates of the influence of different cover types on emergence of above ground biomass, crop size and dry matter content. The filler-containing fabric was used as reference level for the contrast analyses (i.e., differences of other treatments compared to new cover). Hence, the effect of the filler-containing fabric is shown by intercept in the table. Germination score is analyzed assuming Poisson distribution and log link, for other responses a normal distribution and identity link is assumed. Block is included as a random factor in the models and estimates for this is given in standard deviation units.

(d) Crops

The plots covered with the filler-containing fabric had a 2.02 kg (14.4%) higher yield per row than plots covered with the REICROP® cover: 16.08% (95% CI: 15.12-17.04%) versus 14.06% (95% CI: 13.10-15.02%) kg/row as shown in Table 2. Comparing the percentage dry matter content between the filler-containing fabric and REICROP® cover revealed no significant differences between the treatments: 25.43% (95% CI: 24.57-26.29%) versus 25.20% (95% CI: 24.34-26.06%). Estimating yield of dry matter per row by multiplying crop yield with dry matter content for each treatment suggests that the filler-containing fabric results in more dry matter per row (4.09 versus 3.54 kg of dry matter per row).

(e) Discussion

Both cover types increased the temperature both above and below surface at the same magnitude. This was reflected by enhanced plant maturation in the covered plots. Interestingly, the experiment showed a higher yield in plots covered of the filler-containing fabric compared to the REICROP® cover. However, although the filler-containing fabric had increased yield, the correlation between temperature and yield was less clear than expected. There was no significant difference in average temperature between filler-containing fabric and the REICROP® cover. Likewise, although there was statistically significant more variation in temperature for the filler-containing fabric compared to the REICROP® cover, the magnitude of difference was minor.

A reason for this may be that this summer had an ambient temperature well above average the last 20 years. While the high temperatures may have been beneficial early in the season, as indicated by differences in emergence between cover plots compared to control, the high mean July temperature may have actually been above optimal growth temperatures for this cultivar. Hence, an earlier removal of the covers or a more rapid growing cultivar could have been beneficial for the crop yield.

The REICROP® cover performed significantly worse compared to the filler-containing fabric as measured by crop yield. When measuring dry matter content, no difference was revealed, excluding differences in water content as a cause for the difference in yield, measured as mass, of crop. Although the germination scores were slightly higher for the filler-containing fabric compared to the REICROP® cover, this difference was not significant. The yield may have been influenced by July temperatures well above the average for the last 20 years, influencing growth in the main growth period. While lower humidity in the fields with the REICROP® cover, either due to higher evaporation rates or lower penetration of rain, could have reduced growth of tubers, we are not able to conclude on this as humidity was not measured.

Additionally, the visual inspection of the plants development for all plots when the best plot exhibited 20 cm emergence of the plants to provide an indication of earliness and precocity. The precocity is the time gained in a vegetation growth cycle. As noted above, higher emergence scores were exhibited for the filler-containing fabric as compared to the REICROP® cover: 8 (95% CI: 5.21-11.64) versus 7.33 (95% CI: 4.68-10.84). In this regard, the new cover exhibited improved earliness for the planted crops. Consequently, the precocity may be improved according to certain embodiments of the invention. For example, the vegetation growth cycle may be desirably shortened according to certain embodiments of the invention.

(1) Summary of Experimental Field Study

Both cover types exhibited a clear positive impact on emergence and early growth, as well as maturation. However, the filler-containing fabric clearly performed significantly better for tuber growth, yielding in 14.4% higher crop. For dry weight (e.g., the mass of the crops when completely dried) this equals an average 15.5% increase in dry matter yield. Moreover, the new type exhibited an improved earliness (e.g., faster growth) for the planted crops, which may provide the option to shorten the vegetation growth cycle. The study did not reveal any negative influence of the filler-containing fabric on the plants compared to the REICROP® cover or control.

(2) Photosynthetic Active Radiation (PAR)-Transmittance

Figure 5:
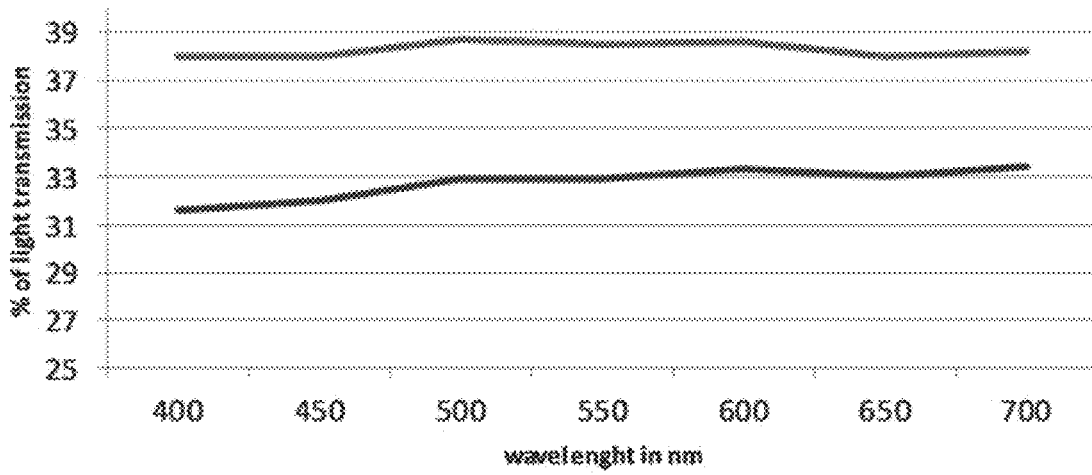
FIG. 5 illustrates photosynthetic active radiation (PAR)-transmittance test results for a polypropylene spunbond fabric containing filler comprising calcium carbonate, an exemplary embodiment of the invention, and a standard polypropylene spunbond fabric that is devoid of filler material.

A 17 gsm polypropylene spunbond fabric which included 15 wt % masterbatch having an 80% loading of filler with the balance in a polypropylene resin (total filler composition of about 12 wt %) comprising calcium carbonate, in accordance with certain embodiments of the invention, was compared to a standard polypropylene spunbond fabric excluding any filler material for light transmittance within the photosynthetic active radiation (PAR) between wavelengths of 400 nm to 700 nm. The general shape of both curves were similar, but the calcium carbonate-containing fabric exhibited a lower value than the fabric excluding a filler. As illustrated in FIG. 5, the average transmittance value within the PAR for the calcium carbonate-containing fabric was notably lower than the standard fabric.

Since the rate of photosynthesis is considered to be directly linked to the transmission in PAR, one would expect plant growth and yield to be reduced when covered with the calcium carbonate-containing fabric. As illustrated in the preceding section (i.e., "(1) Experimental Field Study"), however, the opposite is actually realized according to certain embodiments of the invention. Surprisingly, for instance, use of the calcium-containing spunbond fabric as outlined in the Experimental Field Study above provided an notable increase in yield (e.g., an average 15.5% increase in dry matter) and improved earliness and/or precocity.

(3) Field Tests—Temperature Analysis

Figure 6:
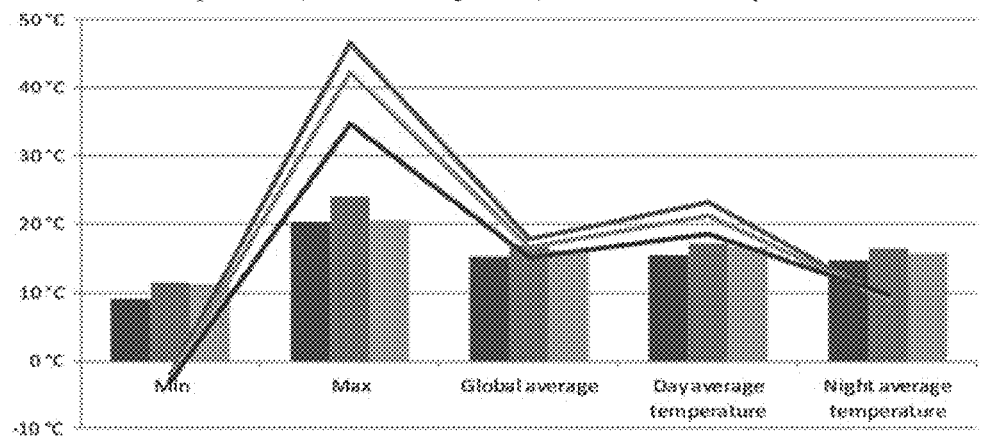
FIG. 6 illustrates a comparison of soil temperature data for a filler-containing fabric, according to certain embodiments of the invention, a standard fabric (no filler), and a control plot having no cover.

Additional field tests were performed to compare soil and air temperatures associated with the use of each of the following: (1) a calcium carbonate-containing spunbond fabric (e.g., 15 wt % of masterbatch comprising 80 wt % calcium carbonate); (2) a standard REICROP® spunbond fabric (e.g., devoid of filler); and (3) a control, in which no crop covering fabric is utilized. The results are illustrated in FIGS. 6-10. In general, the standard REICROP® fabric provided on average, as shown in FIG. 6, a higher temperature value for both soil temperature (e.g., soil from crop planting site covered by fabric) and air temperature (e.g., air temperature of the air under the fabric). The differences in temperatures were generally small, except for the recorded maximum temperature readings for both the soil temperature (as shown as a bar chart on FIG. 6) and air temperature (shown as a plotted line on FIG. 6). The maximum soil temperature readings for the calcium containing-fabric where substantially similar to the control, while the REICROP®) fabric provided a noticeably higher maximum temperature. A similar, but less extreme, observation was observed for the maximum air temperatures.

Figure 7:
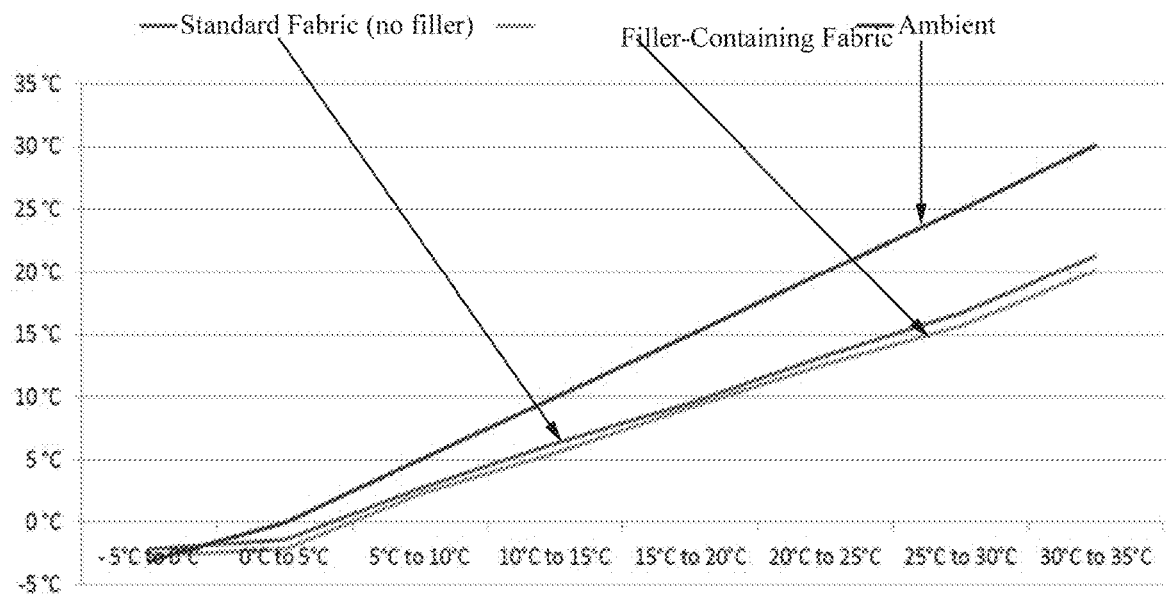
FIG. 7 illustrates the minimum air temperature beneath the fabric versus the ambient air temperature.
Figure 8:
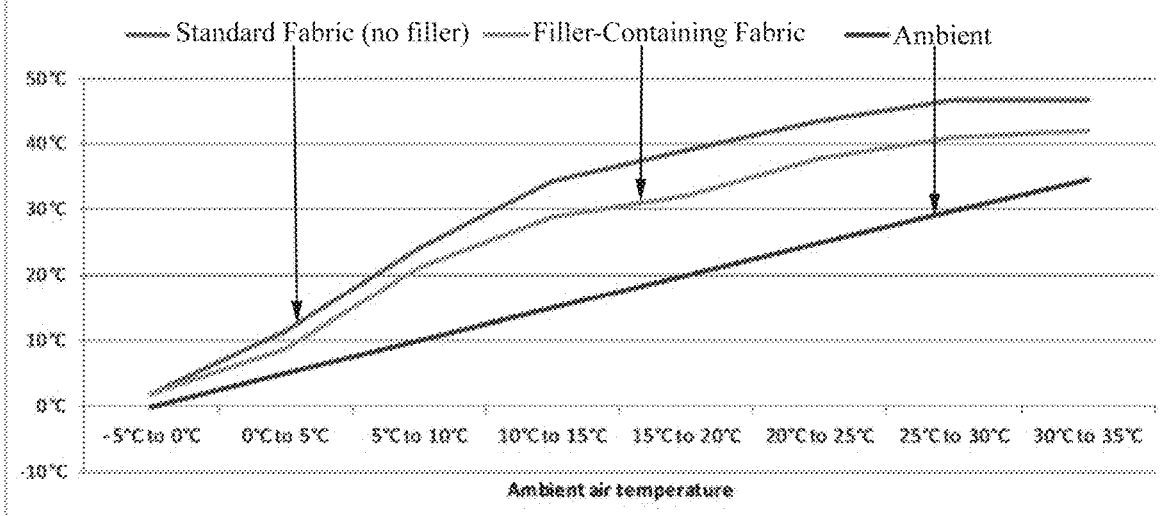
FIG. 8 illustrates the maximum air temperature beneath the fabric versus the ambient air temperature.
Figure 9A:
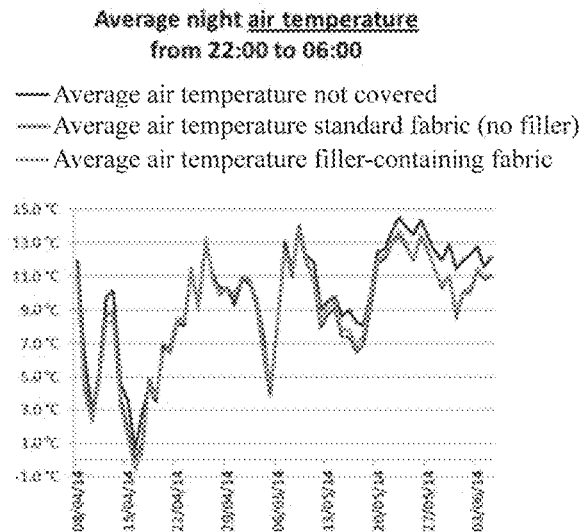
FIGS. 9A and 9B illustrate average air and soil temperatures during the night-time hours of a field study.
Figure 9B:
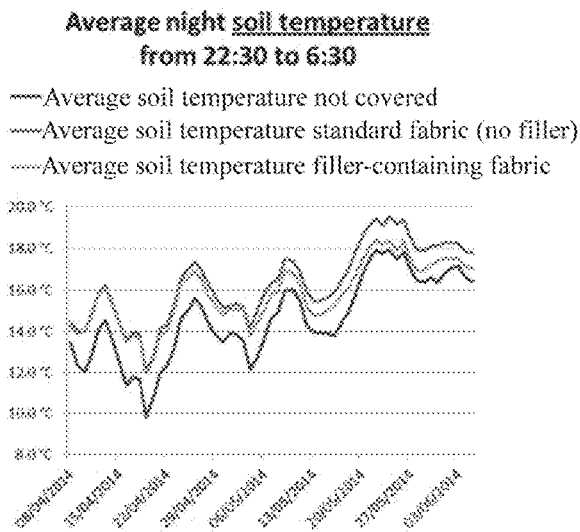
Figure 10A:
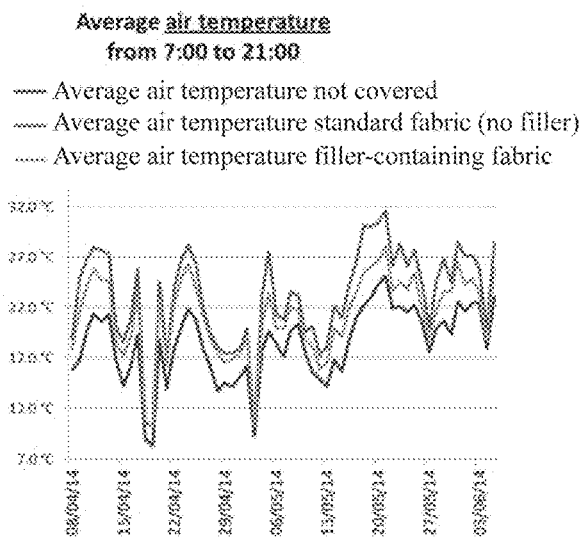
FIGS. 10A and 10B illustrate average air and soil temperatures during the day-time hours of a field study.
Figure 10B:
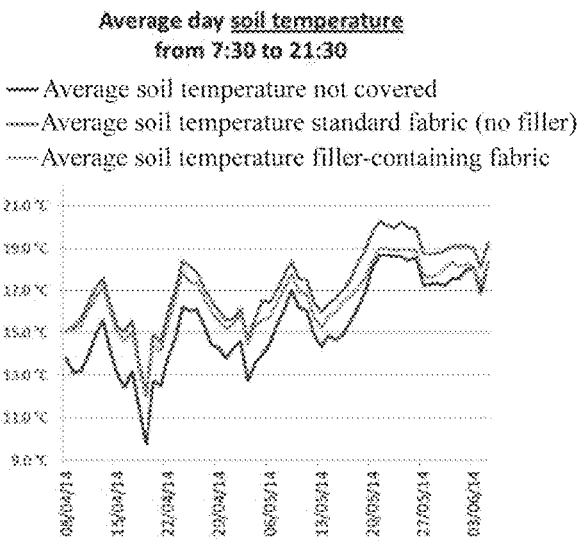

FIG. 7 illustrates the minimum air temperature (e.g., beneath the fabric) depending on the ambient air temperature. As shown in FIG. 7, the minimum air temperature for both fabrics were similar with no significant differences across all recorded ambient air temperatures. FIG. 8 illustrates the maximum air temperature (e.g., beneath the fabric) depending on the ambient air temperature. As shown in FIG. 8, the maximum air temperatures for the REICROP® fabric was noticeably larger than the maximum air temperatures for the calcium carbonate-containing fabric for nearly every recorded ambient air temperature. In this regard, the carbonate-containing fabric provided a similar thermal protection against extreme drops in air temperature below the fabric, but also mitigated heat "spikes" realized by the REICROP® fabric. The calcium carbonate-containing fabric, for example, provided a reduction in temperature peaks, which may provide an agronomic benefit when ambient air temperatures are above an optimal growth temperature for a given crop. FIGS. 9A, 9B, 10A and 10B provide a more detailed representation of average air and soil temperatures during the nights of the study (FIGS. 9A and 9B) and during the day (FIGS. 10A and 10B).

(4) Visual Appearance and Other Properties

Figure 11:
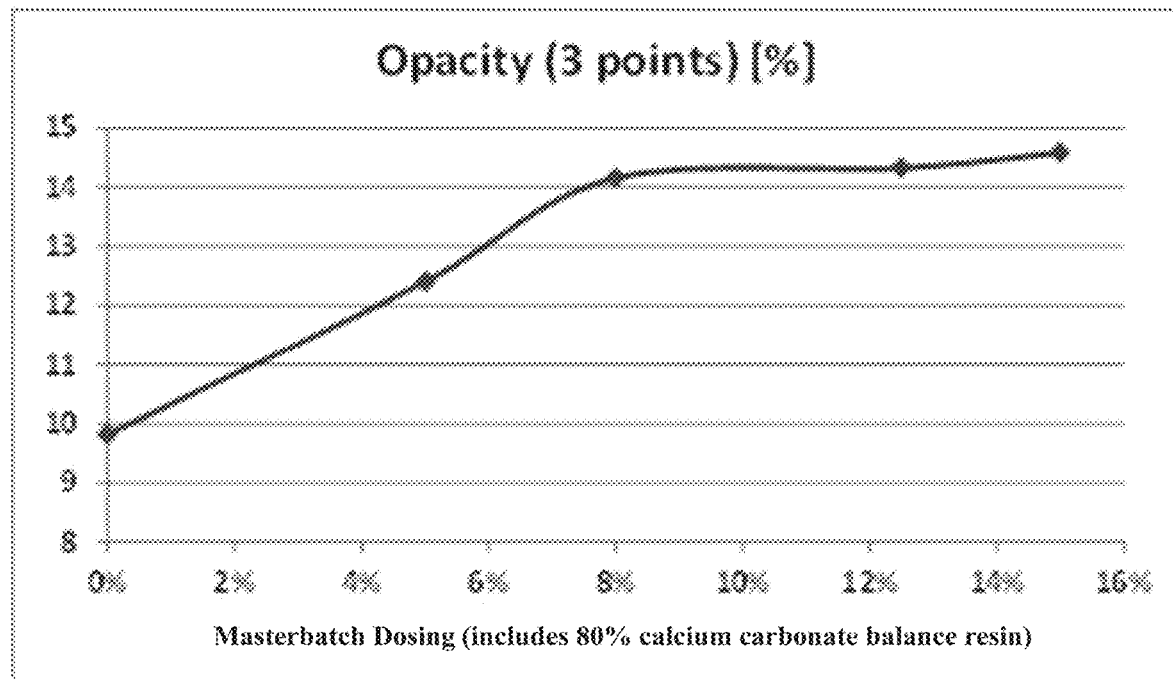
FIG. 11 illustrates the measured opacity of a spunbond polypropylene having varying degrees of calcium carbonate filler therein, according to certain embodiments of the invention.

Additional studies were performed to illustrate the impact of increasing amounts of filler (e.g., calcium carbonate) on the fabrics opacity and air permeability. FIG. 11 illustrates the measured opacity of a spunbond polypropylene having varying degrees of calcium carbonate filler therein. As shown in FIG. 11, which illustrates the opacity (average of three points) versus calcium carbonate dosing, the opacity of the fabric was notably increased with merely about 5 wt % of masterbatch (about 4 wt % calcium carbonate) and essentially leveled off at about 8 wt % masterbatch (about 6.4 wt % calcium carbonate).

Figure 12:
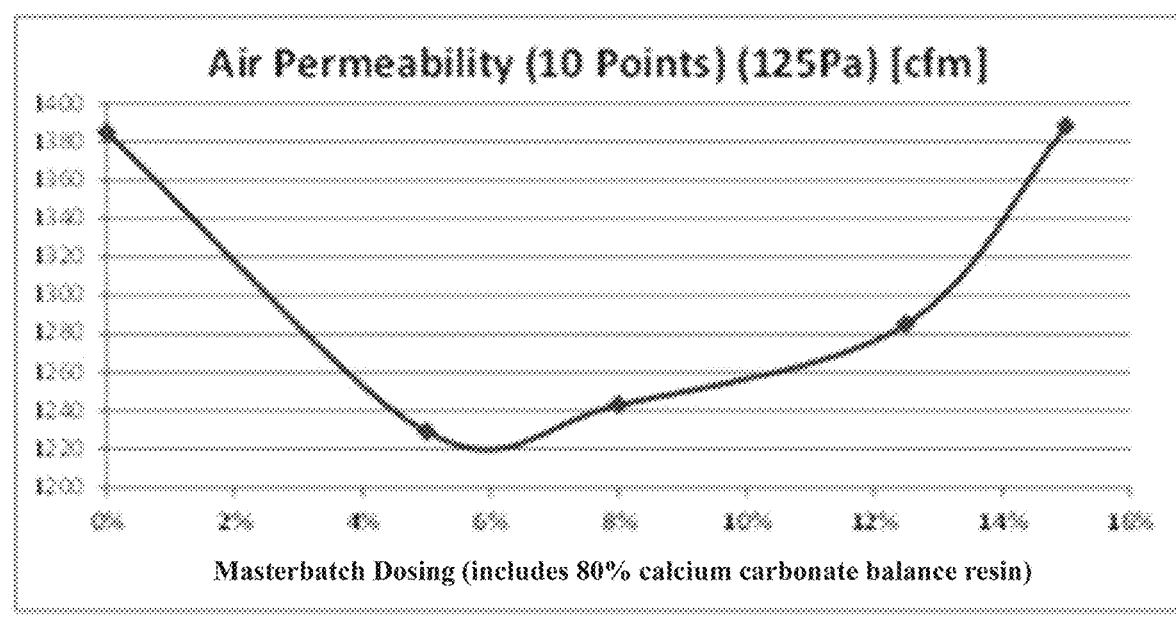
FIG. 12 illustrates the measured air permeability (cfm at 125 Pa.) of a spunbond polypropylene having varying degrees of calcium carbonate filler therein, according to certain embodiments of the invention.

FIG. 12 illustrates the measured air permeability (cfm at 125 Pa) of a spunbond polypropylene having varying degrees of calcium carbonate filler therein. As shown in FIG. 12, the air permeability of the fabric was notably decreased with merely about a 5 wt % of masterbatch (about 4 wt % calcium carbonate) and remained significantly reduced until about 12.5 wt"%© of master batch (about 10 wt % calcium carbonate).

Figure 13A:
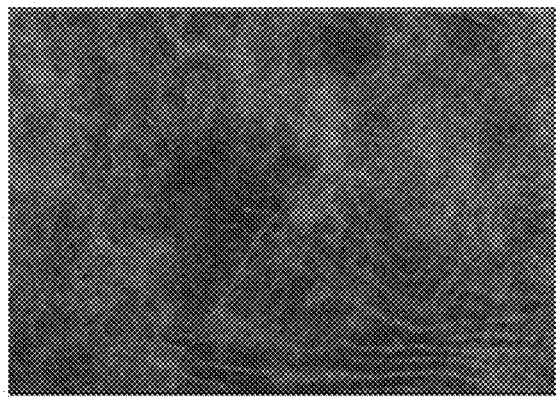
Figure 13B:
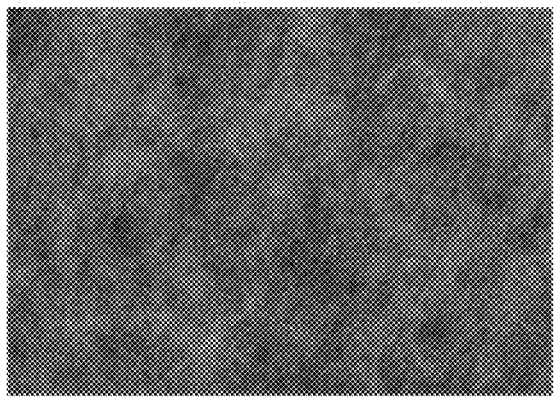
Figure 13C:
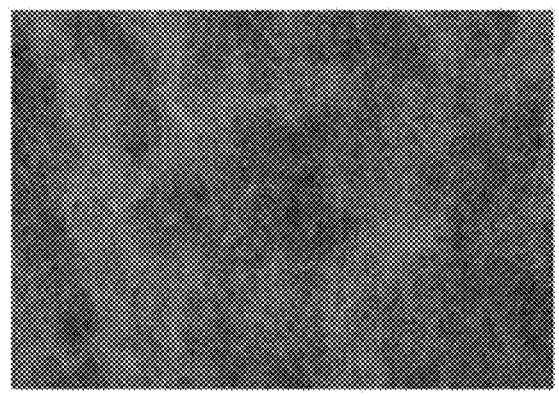
Figure 13D:
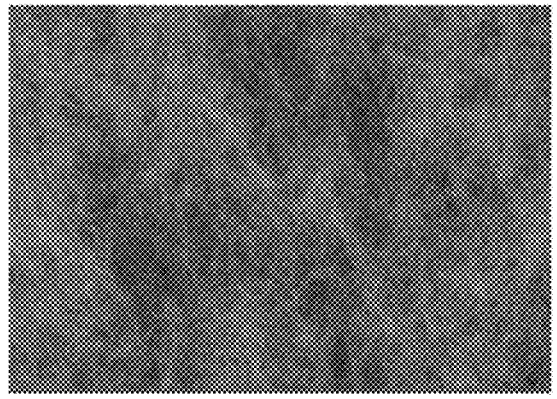
Figure 13E:
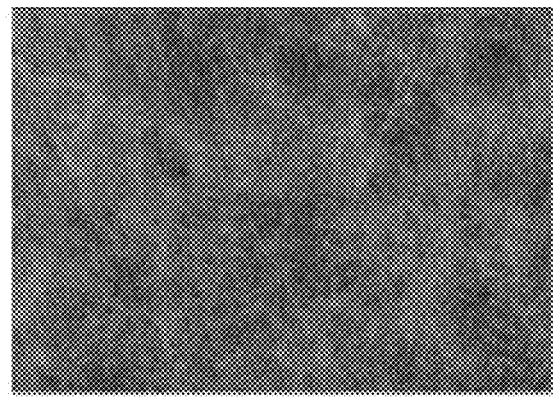
Figure 13F:
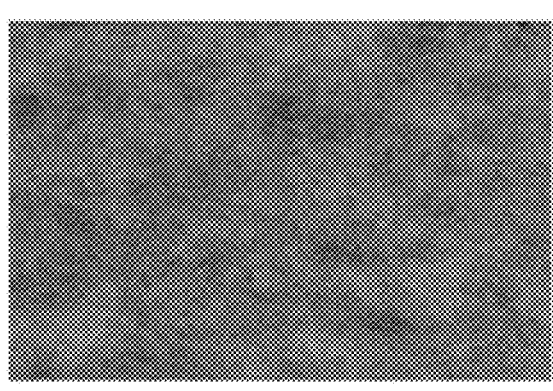

FIG. 13A illustrates a reference nonwoven fabric substantially free of any calcium carbonate. FIGS. 13B, 13C, 13D and 13E illustrate the visual differences in nonwoven fabrics having 4.0 wt %, 6.4 wt %, 10.0 wt % and 12 wt %, respectively, of calcium carbonate. FIG. 13F illustrates a nonwoven fabric having about 12 wt % of calcium carbonate but also including properties that have been adapted over that found in FIG. 13E to provide a further increase in opacity. For example, without intending to be limiting, even while the samples represented by FIG. 13E and FIG. 13F may have about the same amount of calcium carbonate, the spun sample leading to the nonwoven fabric of FIG. 13F may be such that the tensile strength is reduced relative to the sample of FIG. 13E, but yet providing an improvement in the opacity as shown in the exemplary embodiment of FIG. 13F in comparison to the exemplary embodiment of FIG. 13E.

FIG. 14 illustrates various mechanical properties for a standard polypropylene spunbond fabric (e.g., devoid of filler) and a calcium carbonate-containing polypropylene spunbond including 15 wt % of a masterbatch comprising calcium carbonate at an 80% loading effectively yielding 12 wt % of calcium carbonate. FIG. 14, for instance, provides a comparison between calcium carbonate-containing polypropylene spunbond fabrics (i.e., referenced as Step 2.1, 3, and 3B in FIG. 14) in accordance with an embodiment of the invention and the average values for REICROP® L1 product (i.e., referenced as Avg. February-2014 in FIG. 14). The abbreviations used in FIG. 14 and corresponding test methods identified in Tables 4 and 5 below are summarized in Table 3,

TABLE 3

| Abbreviation | Full Nomenclature | Basis of Measured Value | Test Method |
|---|---|---|---|
| BW | Basis Weight | GSM | WSP 130.1(09) |
| MDT | Tensile Strength at Peak Machine Direction | N/50 mm | WSP 110.4(09) |
| MDE | Elongation at Peak Machine Direction | % | WSP 110.4(09) |
| CDT | Tensile Strength at Peak Cross-Direction | N/50 mm | WSP 110.4(09) |
| CDE | Elongation at Peak Cross-Direction | % | WSP 110.4(09) |

Table 4 provides the numerical results for the tests identified in Table 3, while Table 5 provides the relative values versus the values for the reference sample of Table 4.

TABLE 4

| Sample | BW | MDT | MDE | CDT | CDE | MD Energy | CD Energy |
|---|---|---|---|---|---|---|---|
| Avg February 2014 | — | 24.5 | 132 | 19.2 | 138 | 32 | 26 |
| Reference(100) | 16.9 | 24.4 | 102 | 17.8 | 114 | 25 | 20 |
| Step 2.1 | 17.4 | 26.0 | 162 | 16.3 | 149 | 42 | 24 |
| Step 3 | 17.1 | 27.1 | 159 | 17.1 | 169 | 43 | 29 |
| Step 3B | 18.3 | 24.9 | 170 | 18.3 | 199 | 42 | 36 |

TABLE 5

| Sample | BW | MDT | MDE | CDT | CDE | MD Energy | CD Energy |
|---|---|---|---|---|---|---|---|
| Avg February 2014 | — | 100 | 130 | 108 | 121 | 130 | 130 |
| Reference(100) | 100 | 100 | 100 | 100 | 100 | 100 | 100 |
| Step 2.1 | 103 | 106 | 159 | 92 | 131 | 170 | 120 |
| Step 3 | 101 | 111 | 156 | 96 | 148 | 174 | 142 |
| Step 3B | 108 | 102 | 167 | 103 | 174 | 171 | 179 |

As shown in FIG. 14 and Tables 4 and 5, the calcium carbonate-containing fabric exhibited improved MDE and a significant elongation increase that drives into greater than 50% enhanced energy in the machine direction. Furthermore, there is a slight improvement in tensile strength in the machine direction, and a slight reduction in the tensile strength in the cross-direction.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A method of enhancing crop growth, comprising:
   covering a crop planting site comprising one or more crops planted thereon with a fabric having a spunbond layer comprising filaments including a filler; wherein the fabric comprises a basis weight of least about 12 grams-per-meter-squared (gsm);
   wherein (i) an average transmittance value within a photosynthetic active radiation (PAR) across wavelengths 400 nm to 700 nm of the spunbond layer comprises 37% or less, and (ii) an infrared radiation (IR)-transmittance value across wavelengths 7000 nm to 14000 nm of the fabric comprises from about 10% to about 70%.

2. The method of claim 1, wherein covering the crop planting site comprises applying the fabric directly or indirectly over the crop planting site prior to emergence of the one or more crops.

3. The method of claim 1, wherein covering the crop planting site comprises applying the fabric directly or indirectly over the crop planting site after emergence of the one or more crops.

4. The method of claim 1, wherein covering the crop planting site comprises applying the fabric directly or indirectly over the crop planting site from between about 24 hours to 288 hours after an emergence of the one or more crops.

5. The method of claim 1, wherein covering the crop planting site comprises applying the fabric directly or indirectly over the crop planting site from between about 24 hours to 288 hours after planting of the one or more crops.

6. The method of claim 1, wherein the filaments comprise from about 3 wt. % to about 10 wt. % of the filler.

7. The method of claim 1, wherein the filler comprises organic particles, inorganic particles, or combinations thereof.

8. The method of claim 1, wherein the filler comprises a polymer material having a first melting point that exceeds a second melting point of filaments of the spunbond layer.

9. The method of claim 1, wherein the filler comprises a coated filler.

10. The method of claim 9, wherein the coated filler comprises a coating comprising at least one organic material comprising one or more fatty acids, salts of fatty acids, esters of fatty acids, or any combination thereof.

11. The method of claim 9, wherein filler comprises stearic acid, stearate, ammonium stearate, calcium stearate or any combinations thereof.

12. The method of claim 1, wherein the filler comprises an average particle size between about 2 microns to about 6 microns.

13. The method of claim 1, wherein the fabric comprises an air permeability of greater than about 1200 CFM.

14. The method of claim 1, wherein the spunbond layer comprises a thickness from about 3 mils to about 10 mils.

15. The method of claim 1, wherein the filaments comprise a blend of the one or more polyolefin polymers and at least one elastomer.

16. The method of claim 1, wherein the filaments comprise from about 0.1 wt % to about 20 wt % of the at least one elastomer.

17. The method of claim 15, wherein the at least one elastomer comprises a polypropylene-based elastomer comprising isotactic propylene repeat units and random ethylene units.

18. The method of claim 17, wherein the isotactic propylene repeat units comprise from about 70% to about 90% of the elastomer.

19. The method of claim 1, wherein in the filaments comprise an ultraviolet stabilizer.

20. A method of enhancing crop growth, comprising:
(i) covering a crop planting site comprising one or more crops planted thereon with a fabric having a spunbond layer comprising filaments including a filler; wherein (i) an average transmittance value within a photosynthetic active radiation (PAR) across wavelengths 400 nm to 700 nm of the spunbond layer comprises 37% or less, and (ii) an infrared radiation (IR)-transmittance value across wavelengths 7000 nm to 14000 nm of the fabric comprises from about 10% to about 70%; and
(ii) maintaining the fabric directly or indirectly over the crop planting site for a total time duration of from about 100 to about 4400 hours.

* * * * *